United States Patent
Coetzee et al.

(10) Patent No.: US 9,834,729 B2
(45) Date of Patent: Dec. 5, 2017

(54) OIL WELL PRODUCT TREATMENT

(71) Applicant: CompactGTL Limited, Cleveland (GB)

(72) Inventors: Michiel Coetzee, Cleveland (GB); Michael Joseph Bowe, Preston (GB)

(73) Assignee: CompactGTL Limited, Redcar, Cleveland (GB)

( * ) Notice: Subject to any disclaimer, the term of this patent is extended or adjusted under 35 U.S.C. 154(b) by 868 days.

(21) Appl. No.: 14/359,968

(22) PCT Filed: Nov. 15, 2012

(86) PCT No.: PCT/GB2012/052843
§ 371 (c)(1),
(2) Date: May 22, 2014

(87) PCT Pub. No.: WO2013/076462
PCT Pub. Date: May 30, 2013

(65) Prior Publication Data
US 2015/0291887 A1     Oct. 15, 2015

(30) Foreign Application Priority Data
Nov. 24, 2011   (GB) .................................. 1120327.0

(51) Int. Cl.
*C01B 3/00*     (2006.01)
*C01B 3/02*     (2006.01)
(Continued)

(52) U.S. Cl.
CPC .................. *C10G 2/32* (2013.01); *C01B 3/38* (2013.01); *C01B 3/384* (2013.01); *C10G 2/30* (2013.01);
(Continued)

(58) Field of Classification Search
CPC .... C01B 3/00; C01B 3/02; C01B 3/32; C01B 3/34; C01B 3/38; C01B 3/384;
(Continued)

(56) References Cited

U.S. PATENT DOCUMENTS

| | | |
|---|---|---|
| 2003/0136146 A1 | 7/2003 | Fischer-Calderon et al. |
| 2006/0135630 A1 | 6/2006 | Bowe |
| 2011/0240288 A1 | 10/2011 | Kibby et al. |

FOREIGN PATENT DOCUMENTS

| | | |
|---|---|---|
| WO | 2011135357 A1 | 11/2011 |
| WO | 2013076462 A1 | 5/2013 |

OTHER PUBLICATIONS

International Search Report and Written Opinion for PCT/GB2012/052843 dated Feb. 12, 2013.

*Primary Examiner* — Natasha Young
(74) *Attorney, Agent, or Firm* — Vorys, Sater, Seymour and Pease LLP

(57) ABSTRACT

A plant for treating fluid products obtained from an oil well, to produce a hydrocarbon product, comprises a series of separators at progressively lower pressures, to which the fluid products are supplied in succession. A high pressure gas phase is obtained from the separator and is supplied to a flow restrictor so as to undergo cooling through the Joule Thomson effect, and then passed to a NGL separator to produce a natural gas liquid stream and a gaseous natural gas stream. The natural gas stream is then processed chemically, using a synthesis gas production unit, and a Fischer-Tropsch synthesis unit to produce a synthetic crude oil. The synthetic crude oil is supplied to one of the separators, and the natural gas liquid stream is supplied to another of the separators; the pressure in the one separator is greater than the pressure in the other separator.

15 Claims, 1 Drawing Sheet

(51) Int. Cl.
*C01B 3/32* (2006.01)
*C01B 3/34* (2006.01)
*C01B 3/38* (2006.01)
*C10G 2/00* (2006.01)
*C10G 5/06* (2006.01)

(52) U.S. Cl.
CPC .................. *C10G 2/34* (2013.01); *C10G 5/06* (2013.01); *C01B 2203/0233* (2013.01); *C01B 2203/062* (2013.01); *C01B 2203/0811* (2013.01); *C01B 2203/0827* (2013.01); *C01B 2203/1064* (2013.01); *C01B 2203/1241* (2013.01)

(58) Field of Classification Search
CPC ..................... C01B 2203/00–2203/0205; C01B 2203/0227; C01B 2203/0233; C01B 2203/06; C01B 2203/062; C01B 2203/08; C01B 2203/0805; C01B 2203/0811; C01B 2203/0827; C01B 2203/10; C01B 2203/1041; C01B 2203/1047; C01B 2203/1064; C01B 2203/12–2203/1211; C01B 2203/1235; C01B 2203/1241; C10G 2/00; C10G 2/30; C10G 2/32; C10G 2/34; C10G 5/00; C10G 5/06
See application file for complete search history.

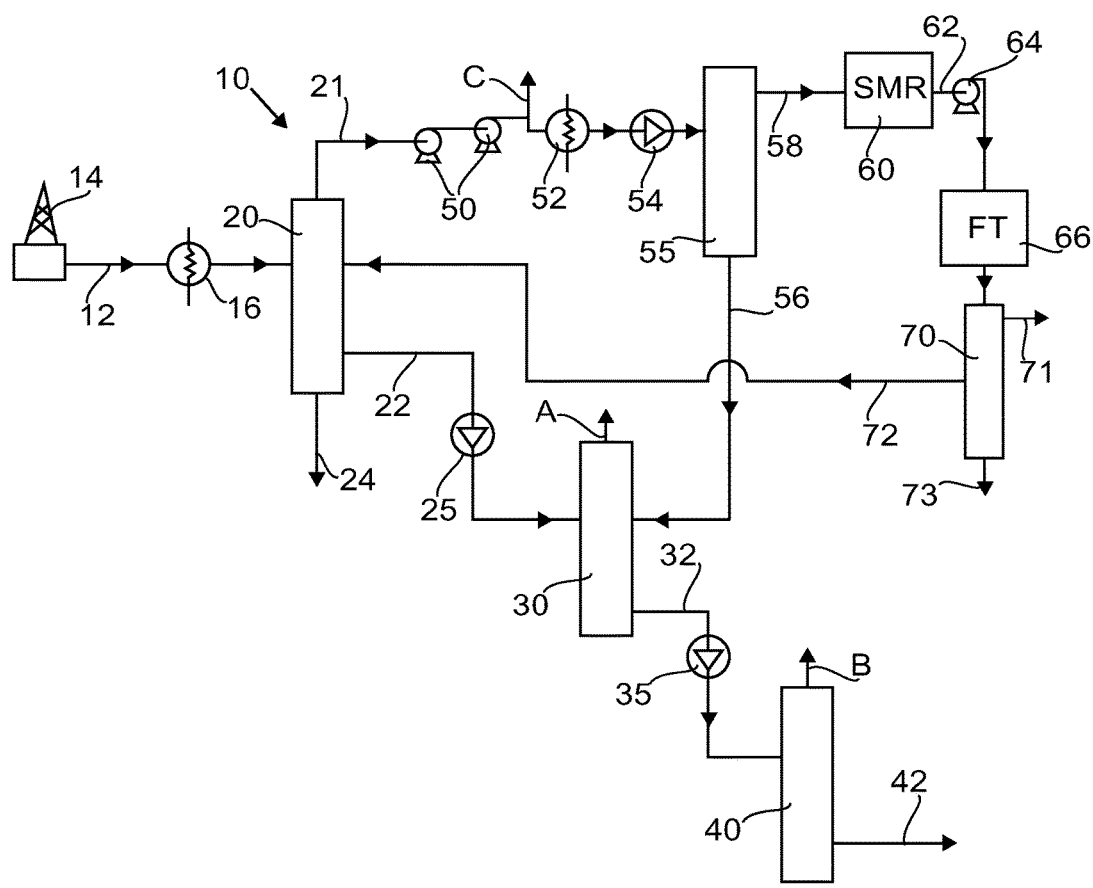

OIL WELL PRODUCT TREATMENT

CROSS REFERENCE TO RELATED APPLICATIONS

This application is a national stage application claiming priority to PCT/GB2012/052843, published as WO2013/076462 and filed on Nov. 15, 2012, which claims priority to Great Britain Patent Application Serial No. GB 1120327.0, filed on Nov. 24, 2011.

The present invention relates to a plant and a process for treating products obtained from an oil well, to produce a liquid hydrocarbon product.

It is well known that most oil wells also produce natural gas. At many oil wells natural gas is produced in relatively small quantities along with the crude oil. In many situations it is impractical to introduce the associated gas into existing gas transportation infrastructure, and the associated gas has typically been disposed of by flaring or re-injection. However, flaring the gas is no longer an environmentally acceptable approach, while re-injection can have a negative impact on the quality of the oil production from the field.

Gas-to-liquids technology can be used to convert the natural gas into liquid hydrocarbons and may follow a two-stage approach to hydrocarbon liquid production comprising syngas generation, followed by Fischer-Tropsch synthesis. In general, syngas (a mixture of hydrogen and carbon monoxide) may be generated by one or more of partial oxidation, auto-thermal reforming, or steam methane reforming. Where steam methane reforming is used, the reaction is endothermic and so requires heat. The syngas is then subjected to Fischer-Tropsch synthesis. For performing Fischer-Tropsch synthesis the optimum ratio of hydrogen to carbon monoxide is about 2:1, and steam reforming has a benefit of providing more than sufficient hydrogen for this purpose.

Such a process is described for example in WO 01/51194 (AEA Technology) and WO 03/006149 (Accentus plc). Natural gas is primarily methane, but also contains small proportions of longer-chain hydrocarbons. In each case the natural gas is first subjected to a pre-reforming step in which the longer-chain hydrocarbons are converted to methane by reaction with steam, for example over a nickel catalyst at 400° C. As regards the Fischer-Tropsch process, as described in WO 2004/050799 (GTL Microsystems AG), a suitable catalyst uses small particles of cobalt on a ceramic support. WO 2011/135357 (CompactGTL plc) describes a process in which the natural gas is initially cooled by subjected to expansion through a flow restrictor so as to undergo cooling through the Joule Thomson effect, with separation of resulting liquids.

According to the present invention there is provided a plant for treating fluid products obtained from an oil well, to produce a hydrocarbon product, the plant comprising:
a series of separators at progressively lower pressures, to which the fluid products are supplied in succession, and from at least one of which is obtained a high pressure gas phase;
an NGL generator to produce, from the high pressure gas phase, a natural gas liquid stream and a gaseous natural gas stream; and
a gas-to-liquid plant to which the gaseous natural gas stream is supplied, the gas-to-liquid plant comprising a synthesis gas production unit, and a Fischer-Tropsch synthesis unit to produce a synthetic crude oil;
wherein the synthetic crude oil is supplied to one of the separators, and the natural gas liquid stream is supplied to another of the separators, the pressure in the separator to which the synthetic crude oil is supplied being greater than the pressure in the separator to which the natural gas liquid stream is supplied.

It will be appreciated that the gas phase from such an oil well typically contains a high proportion of methane, but also contains longer chain hydrocarbons. The natural gas liquid stream (or NGL stream) contains at least a proportion of these longer chain hydrocarbons. Hence the natural gas liquid stream contains hydrocarbons that boil at a temperature above the boiling point of methane, but were initially present in the initial high-pressure gas phase from the oil well.

By way of example, the series of separators may comprise a high pressure separator to which the fluid products from the oil well are supplied, so as to produce a high pressure gas phase, a high pressure crude oil phase, and a water phase; a medium pressure separator to which the high pressure crude oil phase is supplied, to produce a medium pressure gas phase and a medium pressure crude oil phase; and a low pressure separator to which the medium pressure crude oil phase is supplied, to produce a low pressure gas phase and a low pressure crude oil phase.

The present invention also provides a process for treating fluid products obtained from an oil well, to produce a hydrocarbon product, the process comprising:
supplying the fluid products to a series of separators in succession, the separators being arranged to operate at progressively lower pressures, from at least one of which is obtained a high pressure gas phase;
supplying the high pressure gas phase to an NGL generator, so as to produce a natural gas liquid stream and a gaseous natural gas stream; and
supplying the gaseous natural gas stream to a gas-to-liquid plant, the gas-to-liquid plant comprising a synthesis gas production unit, and a Fischer-Tropsch synthesis unit to produce a synthetic crude oil;
wherein the synthetic crude oil is supplied to one of the separators, and the natural gas liquid stream is supplied to another of the separators, the pressure in the separator to which the synthetic crude oil is supplied being greater than the pressure in the separator to which the natural gas liquid stream is supplied.

The NGL generator may comprise a flow restrictor to which the high pressure gas phase is supplied so as to undergo cooling by the Joule Thomson effect, in combination with an NGL separator to produce the natural gas liquid stream and the gaseous natural gas stream.

The high pressure gas phase may be supplied to the flow restrictor through a compressor, and is then cooled to near ambient temperature through a heat exchanger. The expansion through the flow restrictor is intended to take place without significant transfer of heat from the surroundings, the gas expanding into a lower pressure state. The flow restrictor may be a throttle valve, or alternatively may be an inlet nozzle of a vortex tube separator, or a turbo expander, or a Twister™ separator device. A vortex tube, or Ranque-Hilsch tube, splits the gas into a hot gas stream and a cold gas stream. The hot gas stream may be utilised elsewhere within the plant. However, as a result of the division into two streams, only a proportion of the gases are cooled. The expansion can cool the gas to below 0° C., more particularly below −10° C. for example below −15° C., with the consequence that longer-chain hydrocarbons condense from the vapour state into the liquid state, and can be separated from the remaining natural gas as the natural gas liquid stream. The degree of cooling is selected to ensure that the output gaseous natural gas stream is at a pressure sufficient to drive gas through the process. Whilst the temperature can be dropped further in order to increase the recovery of higher hydrocarbons, this ceases to be advantageous when the cost of the increased compression requirements to re-pressurize the gas exceed the value of the additional longer chain hydrocarbons recovered. Preferably the high pressure gas phase is fed into the flow restrictor through a heat exchanger in which it is cooled by contact with at least one fluid that has been cooled by passage through the flow restrictor, so that the high-pressure gas phase is below ambient temperature when it reaches the flow restrictor.

A benefit of this expansion process is that the proportion of longer-chain hydrocarbons in the remaining natural gas is considerably reduced. It may therefore be practicable to then subject the natural gas to reforming without the need for a separate pre-reformer. A further benefit is that the quantity of hydrocarbons subjected to the subsequent chemical processes is reduced, which may reduce the size and hence the cost of the remainder of the plant.

A potential problem in such a cooling process is the risk of formation of methane-containing hydrates, although this may not be an issue with a Twister device as the residence time may be sufficiently short to prevent formation of hydrate crystals. To address this issue, oxygenates such as methanol or ethanol may be introduced into the high pressure gas phase upstream of the flow restrictor. These prevent the formation of hydrates. In the context of the gas-to-liquid plant, such oxygenates are produced during the Fischer-Tropsch synthesis, and can be extracted from the resulting aqueous phase by steam stripping. These oxygenates hence allow the gas stream to be cooled to a lower temperature.

The gaseous natural gas is then converted to synthesis gas either by steam methane reforming, partial oxidation or auto-thermal reforming. In the case of steam methane reforming, the requisite heat may be provided by catalytic combustion within adjacent channels within an integrated reforming/combustion reactor, or by hot exhaust gases from a separate combustion reactor. The resulting synthesis gas contains more hydrogen than is required for Fischer-Tropsch synthesis, and at least some excess hydrogen may be separated from the synthesis gas by a membrane separator, and supplied to a fuel header. If a membrane is not used for separation, separation can be performed by pressure swing absorption. The fuel header may supply the fuel for the combustion process that provides the heat for the steam methane reforming reaction, or may provide fuel for pre-heating an air supply for such a combustion process.

The synthesis gas may then be subjected to a Fischer-Tropsch synthesis reaction to convert the synthesis gas into longer chain hydrocarbons which constitute a synthetic crude oil. This may be a single stage process or a two-stage process. The synthetic crude oil is separated from the aqueous phase and from the tail gas, before being introduced into the separator as described above.

The invention will now be further and more particularly described, by way of example only, and with reference to the accompanying drawing which shows a schematic flow diagram of an oil well product treatment plant and associated equipment.

The oil well product treatment plant 10 is supplied with the fluid products 12 produced by an oil well 14. The plant 10 enables the process of the invention to be performed. Typically the pressure of the fluid products 12 is above 0.8 MPa (8 bar), for example 1.0 MPa (10 bar) or 1.2 MPa. The fluid products 12 are warmed by passage through a heat exchanger 16 to above 50° C., for example to between 65° and 70° C., and are then supplied to a high pressure separator 20 in which the high pressure gas phase 21, the high pressure crude oil phase 22, and the water phase 24 separate from each other. Heating the fluid products 12 before they reach the separator 20 reduces the viscosity of the crude oil phase 22, and so enhances the separation. If the fluid products 12 already have a sufficiently low viscosity, then the heat exchanger 16 would not be required.

The high pressure crude oil phase 22 is then supplied through a pressure reduction valve 25 to a medium pressure separator 30, in which the pressure would typically be in the range 0.4 to 0.5 MPa. In this medium pressure separator 30 a gas phase A separates from the crude oil, producing a medium pressure crude oil phase 32.

The medium pressure crude oil phase 32 is then supplied through a second pressure reduction valve 35 to a low pressure separator 40, in which the pressure would typically be in the range 0.1 to 0.2 MPa, which is a sufficiently low pressure that the resulting low pressure crude oil 42 can be stored. In this low pressure separator 40 a gas phase B separates from the crude oil.

The high pressure gas phase 21 is the major part of the associated gas from the fluid products 12. This is compressed by two successive compressors 50 up to a pressure of for example 4.0 MPa, and is then cooled to near ambient temperature by a heat exchanger 52. Some of the high pressure gas produced by the compressors 50, as indicated by C, may be supplied as fuel for example to a gas turbine to provide energy for the plant 10. The cooled high pressure gas which has passed through the heat exchanger 52 is then supplied through a Joule-Thomson expansion valve 54, dropping the pressure down to about 1.0 MPa, and significantly decreasing the temperature, and then into a separator 55. Longer-chain hydrocarbons condense, and separate to form a natural gas liquid stream 56, leaving a gaseous natural gas stream 58 principally containing the shorter-chain hydrocarbons. The natural gas liquid stream 56 is fed into the medium pressure separator 30, where a large part of the hydrocarbons dissolve in the crude oil.

The gaseous natural gas stream 58 is then subjected to a gas-to-liquid chemical process. The first stage of the chemical process involves the formation of synthesis gas, for example by steam reforming, by a reaction of the type:

$$H_2O + CH_4 \rightarrow CO + 3H_2 \quad (1)$$

This reaction is endothermic, and may be catalysed by a rhodium or platinum/rhodium catalyst in a first gas flow channel. The heat required to cause this reaction may be provided by catalytic combustion of a gas such as methane or hydrogen, which is exothermic, in an adjacent channel, or by heat exchange with exhaust gases from a separate combustion reactor. The combustion may be catalysed by a palladium catalyst in an adjacent second gas flow channel in a compact catalytic reactor. In both cases the catalyst may be on a stabilised-alumina support which forms a coating typically less than 100 μm thick on a metallic substrate. Alternatively, the catalyst may be applied to the walls of the flow channels or may be provided as pellets within the flow channel. The heat generated by the combustion would be conducted through the metal sheet separating the adjacent channels.

The gas mixture produced by the steam/methane reforming is then used to perform a Fischer-Tropsch synthesis to generate a longer chain hydrocarbon, that is to say:

$$nCO + 2nH_2 \rightarrow (CH_2)_n + nH_2O \quad (2)$$

which is an exothermic reaction, occurring at an elevated temperature, typically between 190° C. and 280° C., for example 230° C., and an elevated pressure typically between 1.8 MPa and 2.6 MPa (absolute values), for example 2.5 MPa, in the presence of a catalyst such as iron, cobalt or fused magnetite, with a potassium promoter. Whilst Fe based catalysts can be used, metallic Co promoted with precious metals such as Pd, Pt, Ru or Re doped to 1 wt % are preferred when operating at lower temperatures as they have enhanced stability to oxidation. The active metals are impregnated to 10-40 wt % into refractory support materials such as $TiO_2$, $Al_2O_3$ or $SiO_2$ which may be doped with rare earth and transition metal oxides to improve their hydrothermal stability.

Hence the gaseous natural gas stream 58 is supplied to a steam/methane reforming reactor 60 to produce a synthesis gas stream 62. The synthesis gas stream 62 is typically at a pressure of about 0.5 MPa, and it is compressed through one or more compressors 64 to a pressure of, for example, 2.5 MPa before being supplied to one or more Fischer-Tropsch synthesis reactors 66 (only one of each is shown). The synthesis gas stream may flow through one or more Fischer-Tropsch reactors arranged in series. Alternatively, or additionally, the synthesis gas stream may be split and provided to more than one Fischer-Tropsch reactor arranged in a parallel array. The output from the Fischer-Tropsch synthesis reactors 66 is supplied to a product separator 70, from which emerge a tail gas 71, a liquid hydrocarbon which is a synthetic crude oil 72, and an aqueous stream 73. The synthetic crude oil 72 is then fed into the high pressure separator 20, in which a large part of the hydrocarbons dissolve in the crude oil.

As an optional feature it may be desirable to extract oxygenates such as methanol from the aqueous stream 73, for example by steam stripping; and then to inject the oxygenates into the high pressure gas phase 21 upstream of the expansion valve 54, so as to suppress the formation of hydrates.

As another optional feature a second heat exchanger 52 may be provided upstream of the expansion valve 54, in which the liquefied natural gas stream 56 is used as a coolant to cool the high pressure gas phase 21 to a lower temperature before it undergoes the expansion.

The gas streams A and B constitute a small proportion of the hydrocarbon gases from the oil well 14. They may be compressed, and fed back into the high pressure gas phase 21. Alternatively they may be used as fuel in the plant 10, for example for the combustion reactions that are required to enable the reforming reaction to occur in the reactor 60. Alternatively they may be flared.

The invention claimed is:

1. A plant for treating fluid products obtained from an oil well, to produce a hydrocarbon product, the fluid products including a crude oil phase, the plant comprising:
   a series of separators at progressively lower pressures, to which the fluid products are supplied, so the crude oil phase passes in succession through the series of separators, and from at least one of which is obtained a high pressure gas phase;
   an Natural Gas Liquid (NGL) generator to produce, from the high pressure gas phase, a natural gas liquid stream and a gaseous natural gas stream; and
   a gas-to-liquid plant to which the gaseous natural gas stream is supplied, the gas-to-liquid plant comprising a synthesis gas production unit, and a Fischer-Tropsch synthesis unit to produce a synthetic crude oil;
   the plant comprising a first duct to supply the synthetic crude oil to one of the separators, and comprising a second duct to supply the natural gas liquid stream to another of the separators, the separator to which the synthetic crude oil is supplied being at a higher pressure than the separator to which the natural gas liquid stream is supplied.

2. A plant as claimed in claim 1 wherein the series of separators comprises a high pressure separator adapted to operate at 0.8 to 1.2 MPa to which the fluid products from the oil well are supplied, so as to produce a high pressure gas phase, a high pressure crude oil phase, and a water phase;
   a medium pressure separator adapted to operate at 0.4 to 0.5 MPa to which the high pressure crude oil phase is supplied, to produce a medium pressure gas phase and a medium pressure crude oil phase; and
   a low pressure separator adapted to operate at 0.1 to 0.2 MPa to which the medium pressure crude oil phase is supplied, to produce a low pressure gas phase and a low pressure crude oil phase.

3. A plant as claimed in claim 1 wherein the NGL generator comprises a flow restrictor to which the high pressure gas phase is supplied so as to undergo cooling by the Joule Thomson effect, in combination with an NGL separator to produce the natural gas liquid stream and the gaseous natural gas stream.

4. A plant as claimed in claim 3 also comprising a heat exchanger arranged for heat transfer between the high pressure gas phase before it reaches the flow restrictor, and at least one fluid that has been cooled by passage through the flow restrictor.

5. A plant as claimed in claim 3 also comprising means to introduce oxygenates such as methanol or ethanol into the natural gas stream upstream of the flow restrictor.

6. A plant as claimed in claim 5 comprising means to extract the oxygenates from an aqueous product produced by the Fischer-Tropsch synthesis.

7. A plant as claimed in claim 1, wherein the series of separators comprises a first separator, a second separator and a third separator each being arranged to separate a gas phase from a liquid phase.

8. A plant as claimed in claim 1 further comprising pressure reduction valves between the separators.

9. A process for treating fluid products obtained from an oil well, to produce a hydrocarbon product, the fluid products including a crude oil phase, the process comprising:
   supplying the fluid products to a series of separators, so the crude oil phase passes in succession through the series of separators, the separators being arranged to operate at progressively lower pressures, from at least one of which is obtained a high pressure gas phase;
   supplying the high pressure gas phase to an NGL generator, so as to produce a natural gas liquid stream and a gaseous natural gas stream; and
   supplying the gaseous natural gas stream to a gas-to-liquid plant, the gas-to-liquid plant comprising a synthesis gas production unit, and a Fischer-Tropsch synthesis unit to produce a synthetic crude oil;
   wherein the synthetic crude oil is supplied to one of the separators, and
   the natural gas liquid stream is supplied to another of the separators, the separator to which the synthetic crude oil is supplied being at a higher pressure than the separator to which the liquefied natural gas stream is supplied.

10. A process as claimed in claim 9 wherein the NGL generator comprises a flow restrictor to which the high pressure gas phase is supplied so as to undergo cooling by the Joule Thomson effect, in combination with an NGL separator to produce the liquefied natural gas stream and the gaseous natural gas stream.

11. A process as claimed in claim 10 including the step of transferring heat between the natural gas before it reaches the flow restrictor, and at least one fluid that has been cooled by passage through the flow restrictor.

12. A process as claimed in claim 10 also comprising the step of introducing oxygenates such as methanol or ethanol into the natural gas stream upstream of the flow restrictor.

13. A process as claimed in claim 12, wherein the oxygenates are produced within the process as a by-product of the Fischer-Tropsch synthesis.

14. A process as claimed in claim 9, wherein the series of separators comprises a first separator, a second separator, and a third separator, in each of which a gas phase separates from a liquid phase.

15. A process as claimed in claim 14 wherein the first separator, to which the fluid products from the oil well are supplied, operates at 0.8 to 1.2 MPa, so as to produce a high pressure gas phase, a high pressure crude oil phase, and a water phase;

the second separator, to which the high pressure crude oil phase is supplied, operates at 0.4 to 0.5 MPa, to produce a medium pressure gas phase and a medium pressure crude oil phase; and the third separator, to which the medium pressure crude oil phase is supplied, operates at 0.1 to 0.2 MPa to produce a low pressure gas phase and a low pressure crude oil phase.

* * * * *